(12) United States Patent
Rainish (10) Patent No.: US 8,023,532 B2
(45) Date of Patent: Sep. 20, 2011

(54) VARIABLE BIT RATE COMMUNICATION SYSTEM

(75) Inventor: Doron Rainish, Ramat Gan (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 185 days.

(21) Appl. No.: 12/418,622

(22) Filed: Apr. 6, 2009

(65) Prior Publication Data

US 2009/0262757 A1 Oct. 22, 2009

Related U.S. Application Data

(60) Provisional application No. 61/045,770, filed on Apr. 17, 2008.

(51) Int. Cl.
*H04J 13/00* (2011.01)
(52) U.S. Cl. ........................................ 370/479; 370/476
(58) Field of Classification Search .................. 370/532, 370/465; 714/776, 774, 752; 375/295
See application file for complete search history.

(56) References Cited

U.S. PATENT DOCUMENTS

| | | | |
|---|---|---|---|
| 6,694,137 B2 | 2/2004 | Sharon | |
| 6,807,222 B1 | 10/2004 | Widdowson | |
| 7,278,081 B1 * | 10/2007 | Blair et al. ........... | 714/752 |
| 2002/0157058 A1 * | 10/2002 | Ariel et al. ........... | 714/774 |
| 2003/0189956 A1 * | 10/2003 | Tong et al. ........... | 370/532 |
| 2003/0214449 A1 | 11/2003 | King | |
| 2003/0222778 A1 | 12/2003 | Piesinger | |
| 2005/0089086 A1 | 4/2005 | Hwang et al. | |
| 2005/0113040 A1 | 5/2005 | Walker et al. | |
| 2007/0195815 A1 * | 8/2007 | Turner et al. ........... | 370/465 |
| 2008/0077410 A1 * | 3/2008 | Ojala et al. ........... | 704/500 |
| 2008/0098284 A1 * | 4/2008 | Wolfgang et al. ........... | 714/776 |
| 2008/0172593 A1 | 7/2008 | Rainish et al. | |
| 2009/0061760 A1 | 3/2009 | Barak et al. | |
| 2009/0074103 A1 * | 3/2009 | Varadarajan et al. ........... | 375/295 |

FOREIGN PATENT DOCUMENTS

| | | |
|---|---|---|
| EP | 1211839 A2 | 6/2002 |
| EP | 1826937 A | 8/2007 |
| WO | 03050992 A1 | 6/2003 |

OTHER PUBLICATIONS

Hui-Ling Lou et al., "FEC Scheme for a TDM-OFDM Based Satellite Radio Broadcasting System", IEEE Transactions on Broadcasting, IEEE Service Center, vol. 46, No. 1, Piscataway, NJ, USA, Mar. 2000.
EP07121667, Partial European Search Report dated Apr. 9, 2008.

(Continued)

*Primary Examiner* — Kwang B Yao
*Assistant Examiner* — Syed M Bokhari
(74) *Attorney, Agent, or Firm* — D. Kligler I.P. Services Ltd.; Daniel Kligler (57) ABSTRACT

A method for communication over a communication channel includes processing input data, which is accepted at a first variable bit rate, so as to produce output data that is encoded with a Forward Error Correction (FEC) code and has a second bit rate that matches an available bit rate of the communication channel. The output data is transmitted over the communication channel at the available bit rate. The output data is received from the communication channel and decoded so as to reconstruct the input data.

24 Claims, 5 Drawing Sheets

OTHER PUBLICATIONS

"Framing Structure, channel coding and modulation for Satellite Services to Handheld devices (Sh) below 3GHz", DVB document A111 Revision 1, Jul. 2007, www.dvb.org.

Harald Ernst et al., "Transport Layer Coding for the Land Mobile Satellite Channel", Proceedings of the 2004 59th IEEE Vehicular Technology Conference (VTC-2004), vol. 5, pp. 2916-2920, Milan, Italy, May 17-19, 2004.

Ernst Eberlein et al., "Double Use of the Link Margin—Advanced Physical Layer for Satellite Broadcast to Mobile Users", Proceedings of the 2005 Joint Conference (11th Ka and Broadband Communications Conference and 23rd International Communications Satellite Systems Conference), Rome, Italy, Sep. 25-28, 2005.

Ernst Eberlein et al., "Comparison of Physical Later Interleaving to Upper Layer Interleaving", Proceedings of the Seventh Workshop on Digital Broadcasting, Erlangen, Germany, Sep. 14-15, 2006.

Dapeng Wu et al., "Scalable Video Coding and Transport over Broadband Wireless Networks", Proceedings of the IEEE, vol. 89, issue 1, pp. 6-20, Jan. 2001.

Thomas Schierl et al., "Wireless Broadcasting Using the Scalable Extension of H.264/AVC", IEEE International Conference on Multimedia and Expo (ICME-2005), pp. 884-887, Amsterdam, The Netherlands, Jul. 6-8, 2005.

Albert Heuberger et al., Digital Broadcasting to Mobile Users in the 12 GHz-Band, Proceedings of the Anniversary Symposium 20 years Fraunhofer IIS—Microelectronics Applications for Information and Communication Technology, pp. 40-41, Erlangen, Germany, Jul. 1, 2005.

EP Application No. 09157891.4 Search Report dated Jul. 30, 2009.

Kraus, J.D., "Antennas", second edition, pp. 70-73, Tata McGraw-Hill Publishing Company Limited, India, 1997.

Barak et al., U.S. Appl. No. 61/118,450 "Power summation of orthogonal polarized satellite transponders (RP-31)", filed on Nov. 27, 2008.

U.S. Appl. No. 11/374,049 Official Action dated Aug. 7, 2009.

* cited by examiner

VARIABLE BIT RATE COMMUNICATION SYSTEM

CROSS-REFERENCE TO RELATED APPLICATIONS

This application claims the benefit of U.S. Provisional Patent Application 61/045,770, filed Apr. 17, 2008, whose disclosure is incorporated herein by reference.

FIELD OF THE INVENTION

The present invention relates generally to digital communication systems, and particularly to communication systems that transmit data from variable-bit-rate sources.

BACKGROUND OF THE INVENTION

A communication system typically accepts data from a data source and transmits the data over a communication channel. A communication channel can be characterized by its capacity, i.e., the information bandwidth that the channel is able to transfer. In some applications, the data source produces data at a variable bit rate, whereas the channel bit rate is substantially constant. For example, some video compression techniques produce compressed video at a variable bit rate, which depends on the amount of scene activity.

SUMMARY OF THE INVENTION

An embodiment of the present invention provides a method for communication over a communication channel, the method including:

processing input data, which is accepted at a first variable bit rate, so as to produce output data that is encoded with a Forward Error Correction (FEC) code and has a second bit rate that matches an available bit rate of the communication channel;

transmitting the output data over the communication channel at the available bit rate; and receiving and decoding the output data from the communication channel so as to reconstruct the input data.

In some embodiments, the communication channel includes a Constant Bit Rate (CBR) channel. In an embodiment, processing the input data includes encoding the input data using the FEC code to produce encoded data, and modifying the encoded data to produce the output data at the second bit rate. Modifying the encoded data may include dividing the encoded data into multiple segments and selectively processing the segments.

In a disclosed embodiment, processing the input data includes producing FEC code words, and dividing the encoded data includes dividing each of the code words into a plurality of the segments. In another embodiment, selectively processing the segments includes selecting, for each segment, whether to transmit or discard the segment. Additionally or alternatively, selectively processing the segments may include repeating transmission of a previous segment.

In some embodiments, selectively processing the segments includes transmitting over the communication channel indications, which indicate actions applied to the respective segments, and receiving and decoding the output data include receiving the indications and reconstructing the input data responsively to the indications. In an embodiment, the encoded data in a given segment includes multiple bits, and reconstructing the input data includes assigning respective metrics to the bits in the given segment, processing the metrics responsively to a respective indication related to the given segment, and decoding the FEC based on the processed metrics. In another embodiment, reconstructing the input data includes identifying, based on the indication, that the given segment was discarded, re-generating the discarded segment and assigning the metrics so as to indicate that the bits in the re-generated segment are uncertain. In yet another embodiment, reconstructing the input data includes identifying, based on the indication, that the given segment repeats a previous segment, and combining the metrics of the corresponding bits in the given segment and the previous segment.

In still another embodiment, processing the input data includes interleaving the encoded data, and receiving and decoding the output data include de-interleaving the interleaved encoded data. In a disclosed embodiment, processing the input data and receiving and decoding the output data include preserving the first variable bit rate in the reconstructed input data. In an embodiment, preserving the first variable bit rate includes storing the received output data in a memory, and reading the stored data from the memory at a variable latency that preserves the first variable bit rate. In another embodiment, preserving the first variable bit rate includes, before transmitting the output data, delaying the output data by a variable latency that preserves the first variable bit rate in the reconstructed input data.

In some embodiments, the output data is associated with a given communication link, and transmitting the output data includes multiplexing the output data over the communication channel with at least one other output data associated with another communication link. In an embodiment, the other communication link is specified to transfer the other output data at a low latency, and multiplexing the output data and the other output data includes giving the other output data priority over the output data.

There is additionally provided, in accordance with an embodiment of the present invention, apparatus for communication over a communication channel, the apparatus including:

a transmitter, which is arranged to process input data accepted at a first variable bit rate, so as to produce output data that is encoded with a Forward Error Correction (FEC) code and has a second bit rate that matches an available bit rate of the communication channel, and to transmit the output data over the communication channel at the available bit rate; and a receiver, which is arranged to receive and decode the output data from the communication channel so as to reconstruct the input data.

The present invention will be more fully understood from the following detailed description of the embodiments thereof, taken together with the drawings in which:

DETAILED DESCRIPTION OF EMBODIMENTS

Overview

In many communication applications, data that originates from a variable-rate source is to be transmitted over a communication channel whose capacity is substantially constant. It is possible in principle to limit the peak bit rate of the source so as not to exceed the channel capacity, but this solution is inefficient in utilizing the channel. Another possible solution is to buffer the variable-rate data at the transmitter. This solution, however, is often complicated as it requires adding time stamps to the buffered data and transmitting the time stamps over the channel.

Embodiments of the present invention provide improved methods and systems for transmitting data having a variable bit rate. In some embodiments, a transmitter encodes input data for transmission using a Forward Error Correction (FEC) code. The transmitter modifies the bit rate of the encoded data so as to match the instantaneous value of this bit rate to the available bit rate of the channel. This rate modification can be viewed as an adjustment of the FEC code rate. The transmitter transmits the rate-modified encoded data over the channel to a receiver. The receiver reproduces the encoded data, decodes the FEC and reconstructs the data.

In a typical implementation, the encoded data is divided ("sliced") at the transmitter into multiple segments. The transmitter decides, for each segment, whether to transmit or discard ("puncture") the segment. When no segments are currently pending for transmission, the transmitter may repeat the transmission of a previous segment. The transmitter produces and transmits indications, which notify the receiver whether a given segment was transferred as is, punctured or whether it repeats a previously-transmitted segment. The receiver uses these indications in reconstructing the input data.

In an example embodiment, the receiver comprises a FEC decoder, which decodes the FEC using metrics (e.g., Log Likelihood Ratios—LLRs) that are assigned to the different encoded bits. The receiver marks the bits of punctured segments as punctured or erased, e.g., by setting their LLRs to zero. The metrics of the bits in segments that are transferred as is are passed to the FEC decoder without change. For a segment that repeats a previous segment, the receiver combines the metrics of the corresponding bits in both segments.

The segment size is typically chosen to be considerably smaller than the size of the FEC code words. In other words, the bits of a given code word are typically divided among multiple segments. When the bit rate of the input data varies rapidly in comparison with the code word size, the receiver will receive the bits of a given code word in multiple segments, some of which are punctured, some are repeated and some are transferred as is. On average, the rate modification applied to the segments (e.g., puncturing or repetition) still enables the FEC decoder to decode the code words successfully.

In some cases it is desirable to average the rate modification over a period of time that is longer than a single FEC code word. This scenario may occur, for example, when the bit rate of the input data varies slowly, or when the code words are relatively short. In some embodiments, the transmitter increases the averaging time by interleaving the encoded data before it is divided into segments.

The disclosed techniques match the variable nature of the input data to the capacity of the channel (which is generally constant or nearly so) in an effective manner. When using these techniques, the encoded data transmitted over the channel is processed continuously, so that its bit rate matches the available bit rate of the channel. Thus, the channel capacity is utilized efficiently, even for highly variable data sources. Several example transmitter and receiver configurations, which carry out the disclosed techniques, are described herein.

System Description

Figure 1:
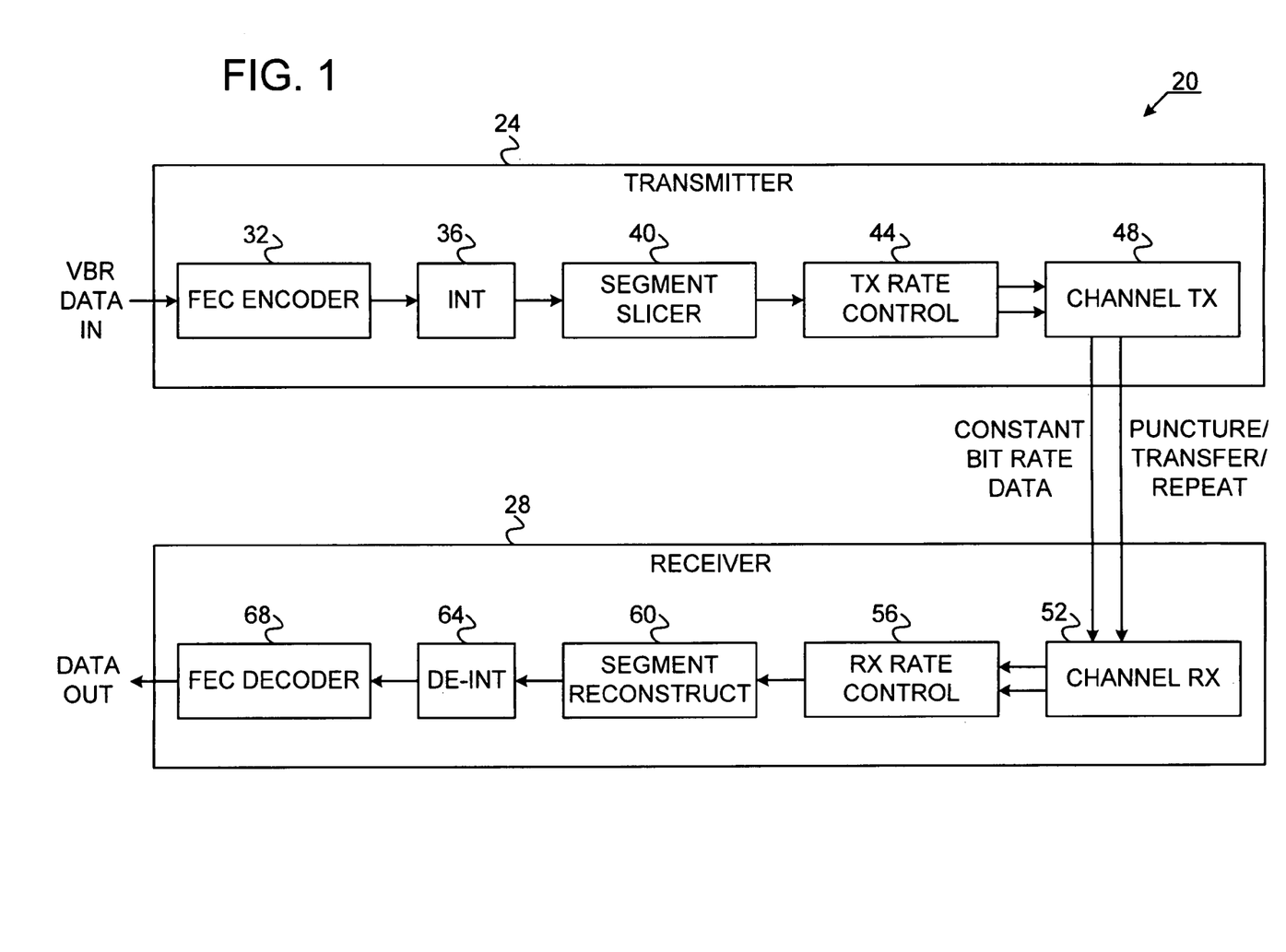
FIG. 1 is a block diagram that schematically illustrates a communication system, in accordance with an embodiment of the present invention.

FIG. 1 is a block diagram that schematically illustrates a communication system 20, in accordance with an embodiment of the present invention. In system 20, a transmitter (TX) 24 accepts input data at a variable bit rate from a Variable Bit Rate (VBR) source, and processes and transfers the data to a receiver (RX) 28 over a Constant Bit Rate (CBR) communication channel. System 20 may comprise, for example, a system for transmitting compressed video over a satellite channel, a system for broadcasting compressed audio, or any other suitable type of communication system.

Transmitter 24 comprises a Forward Error Correction (FEC) encoder 32, which encodes the input data using a suitable FEC code. The FEC code may comprise any suitable code, such as a Reed Solomon (RS) code, a turbo code, a Low Density Parity Check (LDPC) code or any other suitable code. These examples comprise block codes, however any suitable convolutional code can be used, as well. In some embodiments, the FEC may comprise a concatenation of two or more codes.

In the description that follows, the encoded data produced by FEC encoder 32 comprises a sequence of FEC code words, as is typical of block codes. When the FEC comprises a convolutional code, however, the FEC encoder typically produces a continuous sequence of encoded bits. In the present context, the term "code word" is used broadly to describe a sequence of encoded data bits, which may comprise a successive group of bits taken from a continuous stream of encoded bits, or a discrete code word produced by a block FEC decoder. When the encoded data stream is produced by a convolutional encoder having a certain constraint length, a group of bits whose size is larger than the constraint length (e.g., several times the constraint lengths) can usually be regarded as a code word.

In some embodiments, the encoded data is interleaved by an interleaver 36, so as to distribute the encoded data over a relatively long time interval. In some embodiments, interleaver 36 is omitted. The role of interleaver 36 and example interleaver configurations are addressed further below.

The output of interleaver 36 is provided to a segment slicer 40. Slicer 40 divides the interleaved data stream into a sequence of segments of a given size. The segment size is typically chosen to be considerably smaller that the code word size, so that each code word is divided into multiple segments.

The segments produced by slicer 40 are processed by a TX rate control unit 44. Unit 44 transfers the segments selectively, so that the instantaneous bit rate of the encoded data matches the currently-available bit rate of the communication channel. In some embodiments, unit 44 decides, for each segment, whether to transfer the segment as is or to discard ("puncture") the segment. Typically, during periods in which the instantaneous bit rate of the VBR data source is low, unit 44 will transfer the segments without puncturing. During bit rate peaks, however, the instantaneous bit rate of the VBR source may exceed the available bit rate of the channel. In this situation, unit 44 may decide to discard one or more segments.

In some embodiments, unit 44 identifies that no segments are currently pending for transmission. In such cases, unit 44 may decide to repeat transmission of a previously-transmitted segment. This mechanism makes use of the available channel capacity during idle periods (i.e., when the instantaneous bit rate of the source is low) to improve the error performance of the repeated segments.

In some embodiments, unit 44 determines whether the channel is available for transmitting segments by interacting with channel TX 48. For example, TX 48 may indicate to unit 44 (e.g., using a suitable interface line) whether it is busy transmitting a segment or whether it is idle. Based on this indication, unit 44 may decide whether to transfer a pending segment, puncture a pending segment or repeat a previous segment (if no segments are pending).

Typically, rate control unit 40 produces indications, which notify the receiver whether a given segment was transferred as is, punctured or whether it repeats a previously-transmitted segment. These indications are referred to as Puncture/Transfer/Repeat (P/T/R) indications. The P/T/R indications are transmitted over the communication channel to receiver 28, and are used by the receiver in reconstructing the data. The operation of unit 44 is explained in greater detail in the description FIG. 2 below.

In a typical implementation, the code word and segment sizes are chosen so that each code word is divided into multiple segments. (For example, system 20 may use an LDPC code having a code word size of 30,000 bits, and divide each code word into 1,000-bit segments. Alternatively, however, any other suitable code word and segment size can be used.) Some of these segments are transmitted as is, some are punctured and some are repeated. This sort of rate modification can therefore be viewed as a modification of the effective coding rate of the FEC code. The rate modification operation can be viewed as matching the information rate of the transmitted signal to the capacity of the channel.

The segments produces by TX rate control unit 44 are transmitted over the communication channel by a channel TX 48. As explained above, the data provided to TX 48 typically has a substantially constant rate that matches the bit rate of the channel. TX 48 carries out the different operations needed for transmission over the channel. For example, when the channel comprises a wireless Radio Frequency (RF) channel, TX 48 typically modulates the data, converts the modulated data to an analog signal, up-converts the signal to the channel frequency, amplifies the signal to the appropriate power level and transmits it via an antenna toward receiver 28. Other types of communication channels may involve other types of operations. For example, when the channel comprises a wire-line channel, TX 48 may comprise a suitable channel interface rather than an antenna.

In receiver 28, a channel RX 52 receives the signal from the channel. RX 52 performs the operations needed to extract the signal from the channel and to convert it to digital data. In a wireless application, for example, RX 52 typically receives the RF signal transmitted by TX 48 using an antenna, down-converts the RF signal to baseband, performs analog to digital conversion and demodulates the signal. RX 52 produces a data stream that resembles the data stream input to TX 48. This data stream conveys the segments, which were transferred selectively by unit 44 in the transmitter, along with the respective P/T/R indications.

Receiver 28 comprises a RX rate control unit 56, which reconstructs the original segments produced by slicer 40 from the received segments and the P/T/R indications. The operation of unit 56 is explained in greater detail in the description FIG. 3 below. The segments produced by unit 56 are re-assembled into FEC code words by a segment reconstruction unit 60. In embodiments in which the code words are interleaved by transmitter 24, receiver 28 comprises a de-interleaver 64, which de-interleaves the output of unit 60 and reproduces the FEC code words. A FEC decoder 68 decodes the FEC so as to reconstruct the VBR data. The output of FEC decoder is provided as output of receiver 28.

Typically, the FEC decoder decodes each code word by operating on respective metrics that are assigned to the bits in the code word. The metrics typically indicate the confidence level or reliability of the bits. The metrics may comprise, for example, Log Likelihood Ratios (LLRs) of the bits, as is known in the art. Alternatively, however, any other suitable type of metrics can also be used. In the present example, the metrics are produced by channel RX 52. The metrics may be further processed by RX rate control unit 56, as will be explained below.

Figure 2:
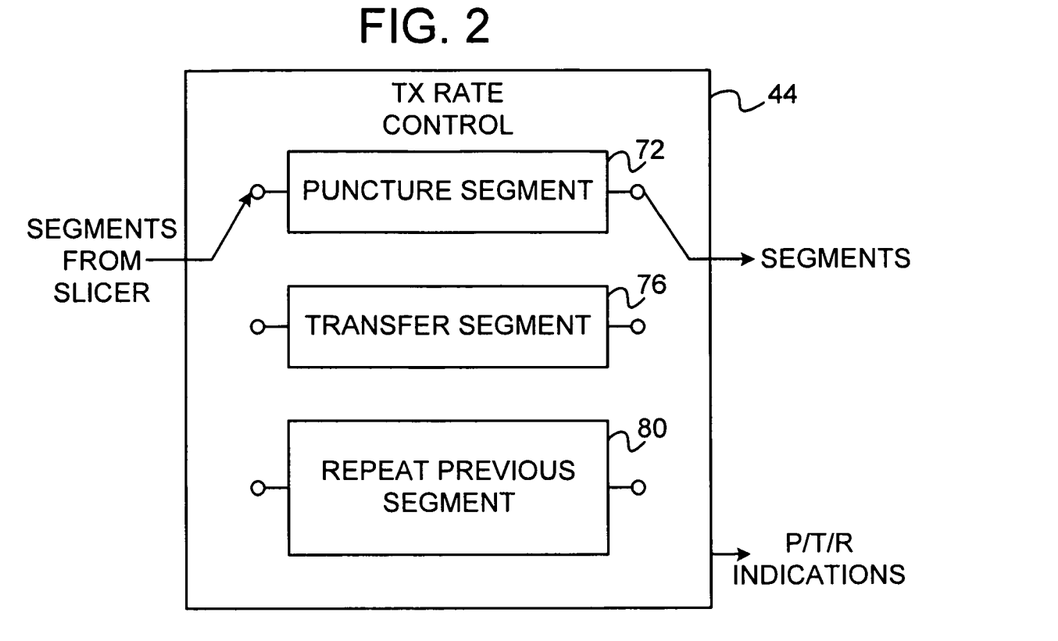
FIG. 2 is a block diagram that schematically illustrates a transmitter rate control unit, in accordance with an embodiment of the present invention.

FIG. 2 is a block diagram that schematically illustrates TX rate control unit 44 in transmitter 24, in accordance with an embodiment of the present invention. Unit 44 accepts segments from slicer 40 and transfers them selectively in order to match the instantaneous bit rate of the VBR source to the available bit rate of the channel. In the present example, unit 44 comprises a puncturing module 72, a transferring module 76 and a repetition module 80. Unit 44 decides, for each incoming segment, whether it should be punctured or transferred as is, i.e., whether it should be processed by module 72 or 76, respectively. When no segments are currently pending for transmission, unit 44 repeats transmission of a previously-transmitted segment using module 80. Unit 44 produces P/T/R indications, which indicate the P/T/R status of each segment. Unit 44 provides the selectively-transferred segments and the P/T/R indications to channel TX 48.

Figure 3:
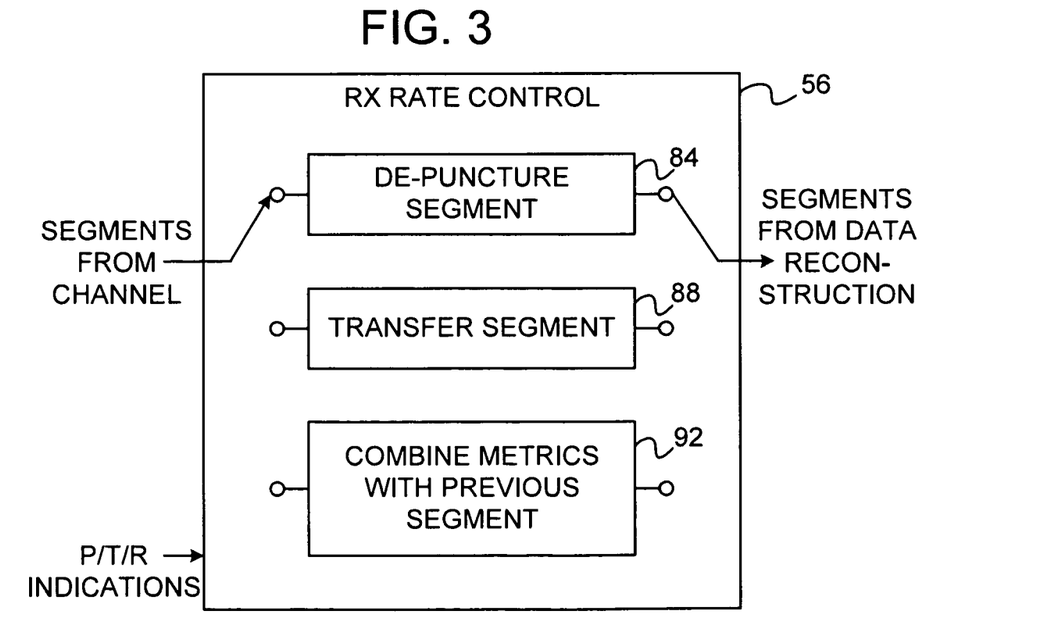
FIG. 3 is a block diagram that schematically illustrates a receiver rate control unit, in accordance with an embodiment of the present invention.

FIG. 3 is a block diagram that schematically illustrates RX rate control unit 56 in receiver 28, in accordance with an embodiment of the present invention. Unit 56 receives segments and P/T/R indications from channel RX 52. For each segment, unit 56 also receives the metrics (e.g., LLRs) of the different bits in the segment, as produced by RX 52. Based on the P/T/R indications, unit 56 decides whether a given segment has been punctured, transferred as is or whether it repeats a previous segment. (For a punctured segment, only the P/T/R indication of this segment is received, not the segment itself.) Unit 56 comprises a de-puncturing module 84, a transferring module 88 and a combining module 92, which handle punctured, transferred and repeated segments, respectively.

In response to a P/T/R indication indicating a punctured segment, de-puncturing module 84 creates a new segment. The bit values in the new segment can be set arbitrarily, such as to all "0"s or all "1"s. The metrics of the bits in this segment are set to values that represent punctured bits, i.e., bits whose values are uncertain and have low confidence level. For example, when using LLRs, the LLR values of the bits in the new segment are set to zero.

In response to a P/T/R indication indicating a segment that was transferred as is, transferring module 88 transfers the segment as is from RX 52 to reconstruction unit 60. Unit 56 does not modify the metrics of the bits in this segment.

In response to a P/T/R indication indicating a segment that repeats a previous segment, combining module 92 combines the metrics of the bits in the segment with the metrics of the corresponding bits in the segment being repeated. In other words, for the $n^{th}$ bit, module 92 combines the metric of the $n^{th}$ bit in the present segment with the metric of the $n^{th}$ bit in the previous segment that is repeated by the present segment. For example, when using LLRs, module 92 typically adds the LLRs of the corresponding bits in the two segments. The combined metrics are transferred to reconstruction unit 60 (and thus to the FEC decoder) as the metrics of the present segment.

In summary, consider a given code word that is divided into multiple segments, some of which are punctured, some are transferred as is and some are repeated. By using the above-described mechanism, the FEC decoder is provided with metrics that are based on the P/T/R status of the segments. Bits in punctured segments are marked as punctured, so that the decoder can assign them low weight in the decoding process. Bits in repeated segments are assigned combined metrics from the repeating and repeated segments.

The different elements of transmitter 24 and receiver 28 can be implemented using any suitable hardware components, such as Application-Specific Integrated Circuits (ASICs) or Field-Programmable Gate Arrays (FPGAs), using software elements, or using a combination of hardware and software elements.

Rate Control Method Description

Figure 4:
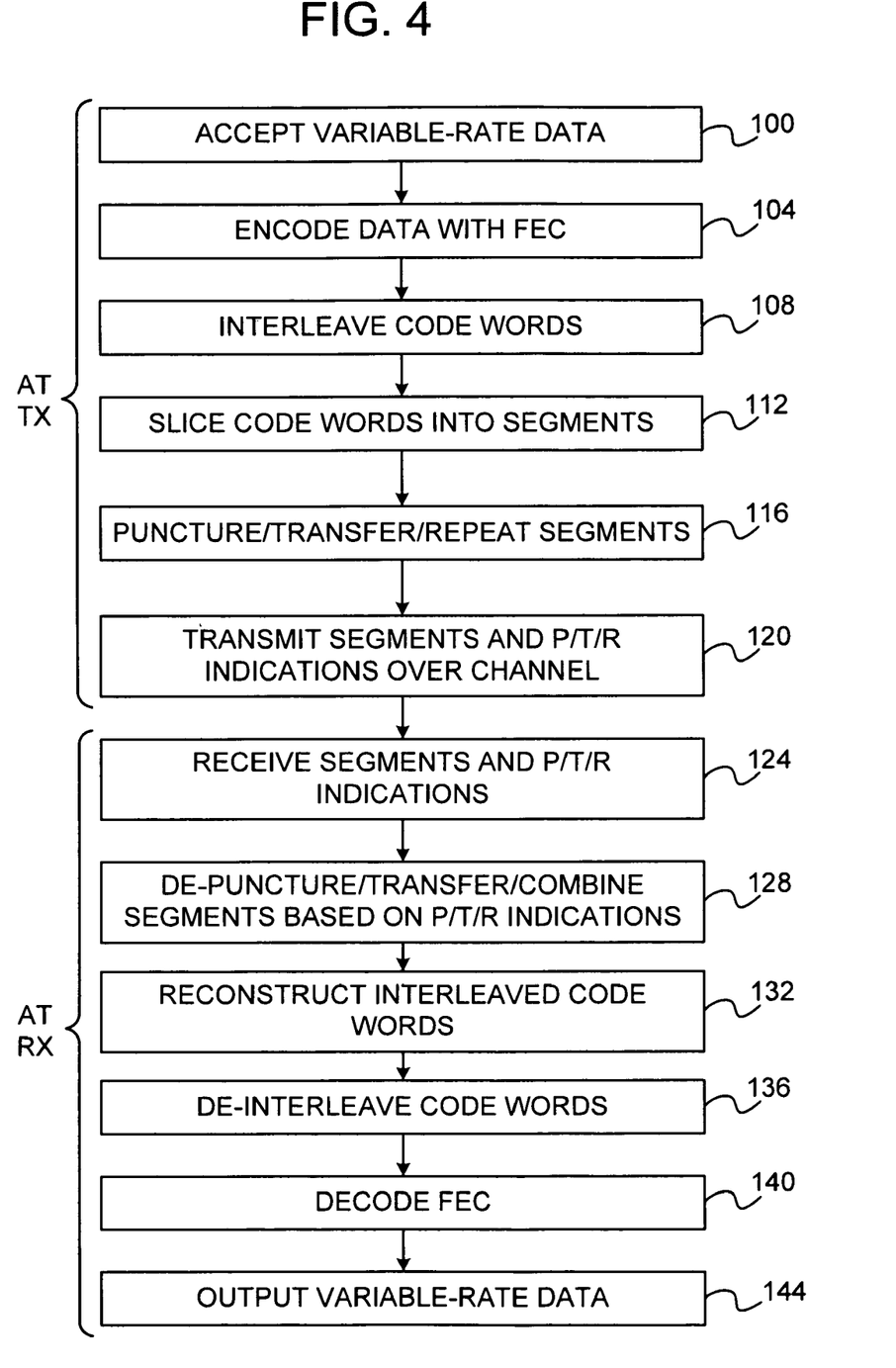
FIG. 4 is a flow chart that schematically illustrates a method for transmitting variable-rate data over a constant-rate channel, in accordance with an embodiment of the present invention.

FIG. 4 is a flow chart that schematically illustrates a method for transmitting variable-rate data over a constant-rate channel, in accordance with an embodiment of the present invention. The method begins with transmitter 24 accepting variable-rate data for transmission, at an input step 100. FEC encoder 32 encodes the input data, at an encoding step 104. Interleaver 36 interleaves the encoded data, at an interleaving step 108. Slicer 40 divides the encoded and interleaved data into segments, at a slicing step 112. TX rate control unit 44 punctures, transfers or repeats the segments, at a selective transferring step 116, as described above. Unit 44 also assigns each segment an appropriate P/T/R status and produces the appropriate P/T/R indications. Channel TX 48 transmits the segments and the P/T/R indications produced by unit 44 over the communication channel, at a transmission step 120.

Channel RX 52 in receiver 28 receives the segments and the P/T/R indications from the channel, at a reception step 124. RX rate control unit 56 de-punctures, transfers or combines the segments, at a selective reconstruction step 128, as explained above. Unit 56 decides on the appropriate action to be applied to each segment based on the received P/T/R indications. Unit 56 outputs the reconstructed segments along with metrics to be used by the FEC decoder. Reconstruction unit 60 reproduces the encoded data (interleaved FEC code words in the present example) from the reconstructed segments, at a data reconstruction step 132. De-interleaver 64 de-interleaves the encoded data, at a de-interleaving step 136. FEC decoder 68 decodes the FEC using the metrics, at a FEC decoding step 140. The decoded data is provided as output of the receiver, at an output step 144.

Additional Variations and System Configurations

In some embodiments, unit 44 does not repeat previous segments, but only decides whether to transfer or puncture pending segments. In these embodiments, the FEC code rate is chosen to match the minimal bit rate of the VBR source (if such minimal bit rate is defined and known). In such an implementation, unit 44 will puncture an incoming segment if TX 48 is busy transmitting the previous segment, and will transfer the incoming segment if the transmitter is not busy.

The choice whether to use a scheme that punctures, transfers and repeats segments, or a scheme that only punctures or transfers segments, may depend on the type of FEC used. For example, a Reed-Solomon code may be particularly suitable for puncture/transfer schemes. FEC codes that operate on soft metrics and are able to handle puncturing (e.g., convolutional codes, Turbo codes or LDPC codes) may be preferable in puncture/transfer/repeat schemes. The latter codes often perform well in puncture/transfer schemes, as well.

The choice whether or not to use an interleaver and de-interleaver may depend, for example, on the code word length and on the variability of the source bit rate. If the VBR source varies its bit rate rapidly with respect to the code word length, the bit rate can often be averaged adequately over a single code word and interleaving may not be needed. If the VBR source bit rate varies slowly with respect to the code word length, it may be advantageous to distribute the data over more than a single code word. In such cases, interleaving and de-interleaving may be used.

In some embodiments, elements of the transmitter and receiver are used for purposes other than bit rate control. For example, FEC coding and interleaving are often used to mitigate channel effects such as noise, interference, channel blocking, jamming or fading. In many cases, these elements can be used for implementing the rate control methods described herein with little or no additional hardware. When using the FEC code resources for both channel effect mitigation and rate control, there is a soft trade-off between the two. For example, when channel conditions are good, more FEC resources can be used for rate control (i.e., higher instantaneous bit rate can be supported). When channel impairments are strong, they can be mitigated at the expense of lower bit rate. All of these trade-offs can be made automatically and using the same hardware configuration.

The methods and systems described herein can be used in various communication applications. Some of these applications, such as file transfer, have off-line characteristics. Other applications, such as video broadcast, have real-time characteristics. In real-time applications, the communication system is often required to preserve the real-time characteristics of the variable data rate of the data source. In addition to transferring the data successfully from the transmitter to the receiver, the instantaneous bit rate of the input data should be preserved. In other words, this requirement means that the communication system should have a substantially constant end-to-end delay.

Some communication applications, such as file transfer, do not require preservation of the real-time characteristics of the variable data source. System 20 of FIG. 1 above may not always preserve these real-time characteristics, and may therefore be particularly suitable for this sort of off-line applications. The alternative system configurations shown in FIGS. 5 and 6 below do preserve the instantaneous bit rate from end to end, and are therefore particularly suitable for real-time applications. Nevertheless, any of the system configurations shown in FIGS. 1, 5 and 6 may be used for both off-line and real-time applications, depending on the specific requirements of the application.

Figure 5:
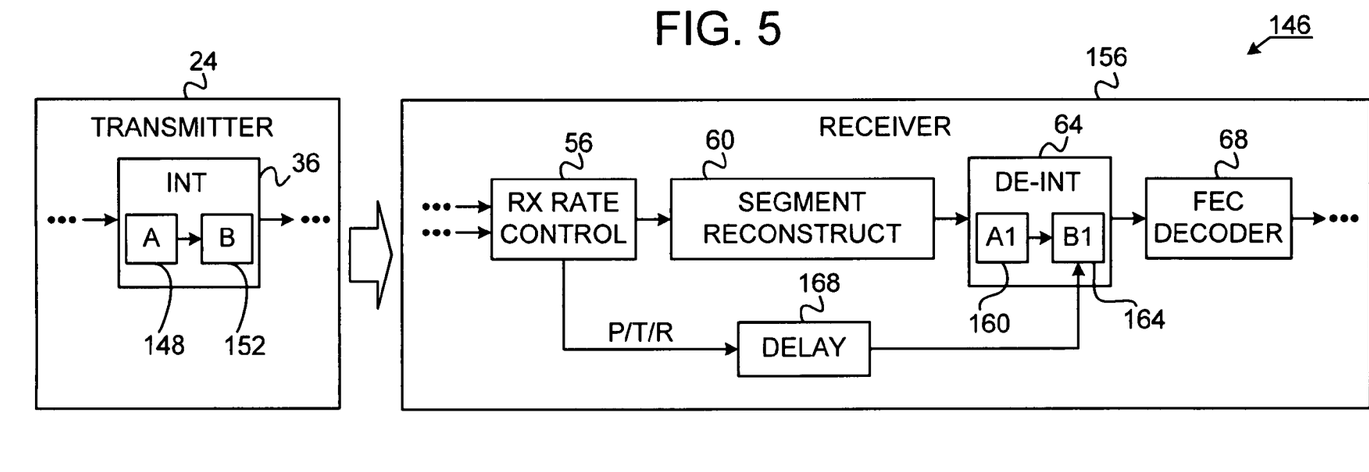
FIG. 5 is a block diagram that schematically illustrates a communication system, in accordance with an alternative embodiment of the present invention.

FIG. 5 is a block diagram that schematically illustrates a communication system 146, in accordance with an alternative embodiment of the present invention. Interleaver 36 in transmitter 24 comprises a block interleaver, which comprises two matrices 148 and 152, respectively denoted A and B. The incoming data for transmission (after FEC encoding) is written into matrix A. Data is read from matrix B and provided to slicer 40 (as in FIG. 1 above, not shown in this figure). When matrix A is filled, it is copied into matrix B. Since matrix A is filled at a variable bit rate, matrix B should be read at the same bit rate. In other words, for every bit written into matrix A, a bit should be read from matrix B.

System 146 comprises a receiver 156, which outputs the reconstructed data at a bit rate that preserves the instantaneous bit rate of the data source. De-interleaver 64 in receiver 156 comprises two matrices 160 and 164, respectively denoted A1 and B1. The matrices are stored in a suitable memory at the receiver. Matrix A1 is filled at a variable bit rate with data produced by RX rate control unit 56. Matrix B1 is emptied at a similar rate but at a delay denoted D, the delay (in bits) of de-interleaver 64. (If the data source produces the same number of bits in each interval of D bits, no additional buffering is needed. Otherwise, a small additional buffer may be inserted between matrices A1 and B1 in order to compensate for these fluctuations. This additional buffer is not shown in the figure.) The number of bits in each of the interleaver matrices (A and B) is denoted $N_i$, the size of each segment (in bits) is denoted $N_s$. Assume, for the sake of clarity, that $N_i = K \cdot N_s$, i.e., the interleaver size is an integer multiple of the segment size. (This constraint, however, is not mandatory.)

In order to preserve the instantaneous bit rate, de-interleaver 64 reads groups of $N_s$ bits out of matrix B1 at a rate that is controlled by a First-In-First-Out (FIFO) buffer 168. Buffer 168 has a length of K. In this embodiment, RX rate control unit 56 produces T/P/R tokens and provides them as input to buffer 168. Each token indicates whether the current segment has been transferred as is, punctured or repeated. De-interleaver 64 reads and outputs groups of $N_s$ bits out of matrix B1 in response to the token at the output of buffer 168. If the token at the output of buffer 168 indicated a punctured or transferred segment, the de-interleaver reads a group of $N_s$ bits out of matrix B1. If the token at the output of buffer 168 indicated a repeated segment, no bits are read from the matrix.

Figure 6:
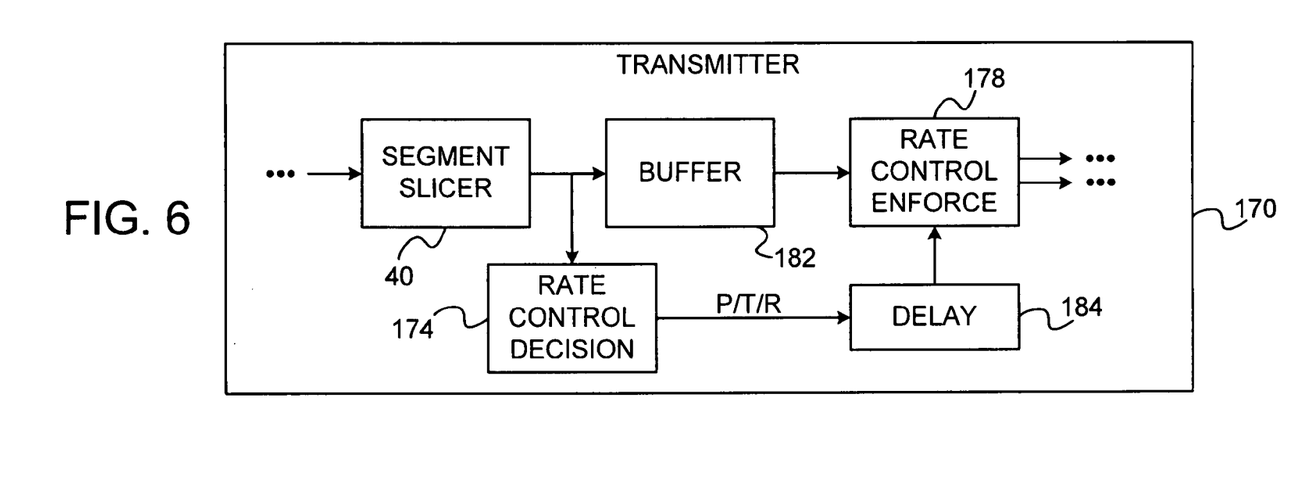
FIG. 6 is a block diagram that schematically illustrates a transmitter, in accordance with an embodiment of the present invention.

FIG. 6 is a block diagram that schematically illustrates a transmitter 170, in accordance with yet another embodiment of the present invention. In this example, preservation of the instantaneous data rate is implemented at the transmitter. The transmitter controls the instantaneous bit rate transmitted over the channel, so that the instantaneous bit rate at the output of the receiver will reproduce the instantaneous bit rate of the data source. Such a scheme is often preferred when the interleaver and de-interleaver are convolutional.

In transmitter 170, the functions of the TX rate control unit are split between a rate control decision unit 174, and a rate control enforcement unit 178. Unit 174 identifies the P/T/R status of each segment and produces the appropriate P/T/R tokens (similar to the tokens described in FIG. 5 above). Unit 178 selectively transfers the segments (i.e., punctures, transfers or repeats the segments) based on the P/T/R tokens. A buffer 182 delays the transmitted data by $N_i$, which denotes the combined delay (in bits) of both the interleaver and the de-interleaver. The P/T/R tokens are delayed by a FIFO buffer 184, which has a length of K, as in FIG. 5 above.

Figure 7:
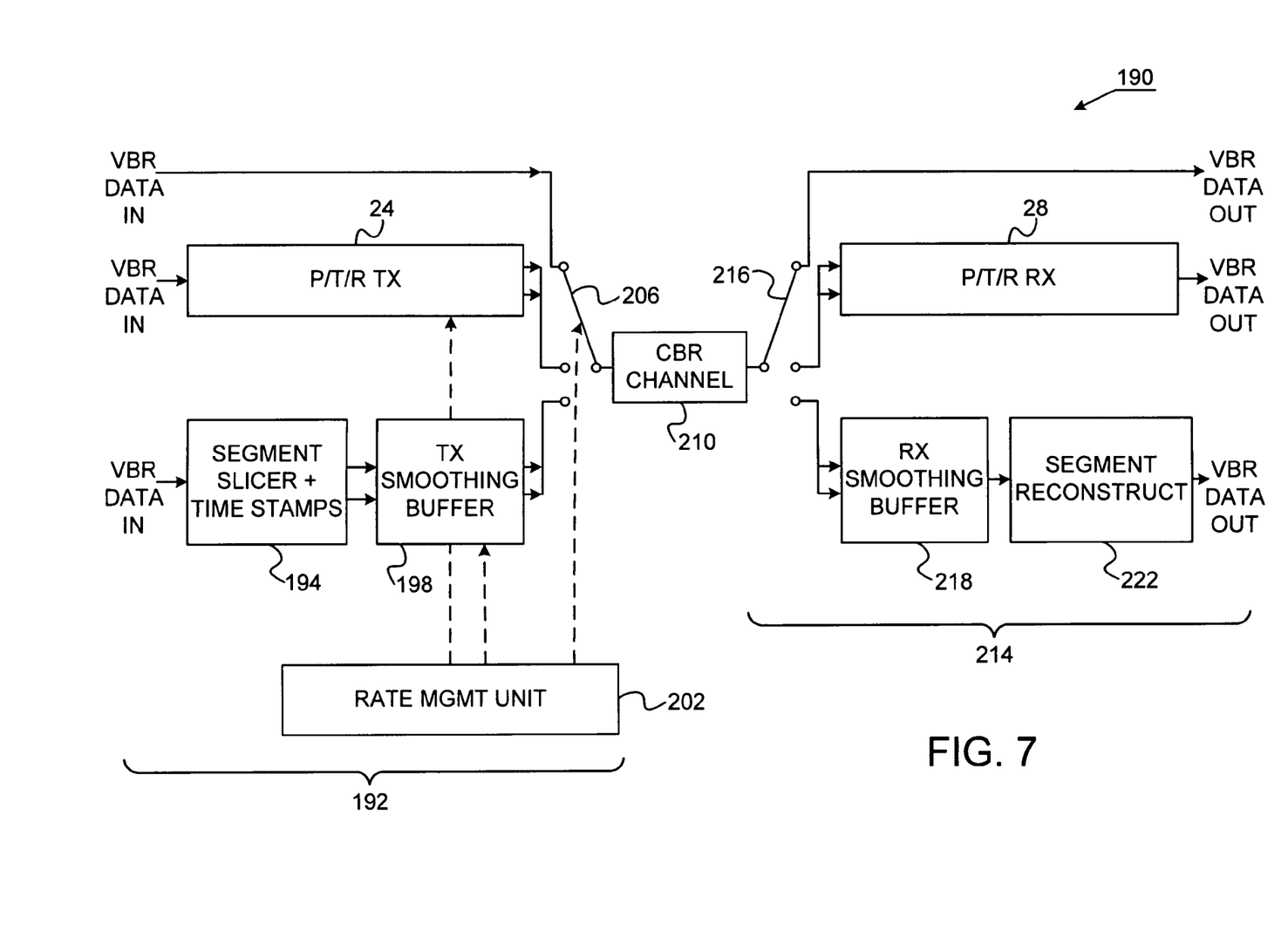
FIG. 7 is a block diagram that schematically illustrates a communication system, in accordance with another embodiment of the present invention.

FIG. 7 is a block diagram that schematically illustrates a communication system 190, in accordance with another embodiment of the present invention. In system 190, multiple transmitters 192 transmit VBR data to respective receivers 214 over a CBR channel 210. Each transmitter/receiver pair is referred to herein as a communication link. The communication links are multiplexed over the channel using a multiplexer 206 and de-multiplexer 216. FIG. 7 shows multiplexing in time domain, although the methods described herein can be used with multiplexing in other domains, such as frequency, code or space. A rate management unit 202 controls the multiplexing operation, i.e., allocates channel resources to the different links.

The communication links in system 190 may be of different types. In the present example, three link types are shown. The link at the top of the figure is designed for minimum latency, and thus has little or no buffering or rate control. This type of link is referred to herein as a "low-latency link." A second link type, which referred to herein as a "P/T/R link," applies the rate control techniques described herein. Such a link may comprise, for example, any of the configurations described in FIGS. 1, 5 and 6 above.

A third link type (shown at the bottom of the figure) transmits VBR data over the CBR channel by buffering the data at the transmitter. This type of link is referred to herein as a "TX buffering link." In such a link, the transmitter typically comprises a segment slicer 194, which also generates time stamps for the respective segments. The segments and time stamps are buffered by a TX smoothing buffer 198, and are then transmitted over the channel. At the receiver of such a link, the received data is buffered by an RX smoothing buffer 218. A segment reconstructor 222 reproduces the data from the received segments and time stamps, and outputs the VBR data.

The example of FIG. 7 shows one link of each type. In alternative embodiments, however, the system may comprise any desired number of links of any desired type. The system may multiplex links belonging to only a single type or to any other subset of the link types.

Rate management unit 202 may apply various policies and trade-offs in allocating channel resources to the different links. In one embodiment, unit 202 may allocate the same amount of channel time to each link. Each link applies rate control or other measures individually. In another embodiment, the individual links do not perform rate control, and the adaptation to the different instantaneous data rates is carried out by unit 202. In this embodiment, unit 202 allocates channel resources to each link based on the instantaneous bit rate of this link. Such a scheme is sometimes referred to as statistical multiplexing.

In some embodiments, the allocation of channel resources is combined with rate adaptation or other measures performed within each link, so as to improve the overall system performance. In other words, unit 202 may allocate more channel resources (channel time) to links having a high instantaneous data rates, and vice versa, in addition to the measures taken by each link.

For example, when system 190 comprises one or more low-latency links and one or more P/T/R or TX buffering links, unit 202 may give priority to the low-latency links in allocating channel time. In such an implementation, when a low-latency link has data to transmit, it is granted access to the channel immediately by unit 202 in order to minimize the latency of this link. The P/T/R links apply puncturing to the pending segments during the temporary lack of access to the channel. Assuming the lack of access is only intermittent, the P/T/R links can compensate for the performance degradation by repeating more segments when they are granted access to the channel again. The TX buffering links buffer the pending data when not granted access to the channel, and transmit the buffered data when access is granted.

In a particular example, system 190 comprises a single low-latency link and a single P/T/R or TX buffering link. Such a configuration can be useful, for example, for transmitting broadcast video signals via satellite links. Aspects of such systems are described, for example, in U.S. Patent Application Publication 2008/0172593, which is assigned to the assignee of the present patent application and whose disclosure is incorporated herein by reference. Any of the configurations described in this cited patent application can be implemented using the P/T/R transmitter and receiver schemes described herein.

Although the embodiments described herein mainly address transmission over Constant Bit Rate (CBR) channels, the methods and systems described herein can also be used with communication channels whose bit rate is not constant. Typically although not necessarily, in such applications the channel bit rate varies more slowly than the rate variations of the data source.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication over a communication channel, the method comprising:
processing input data, which is accepted at a first variable bit rate, so as to produce a code word of a Forward Error Correction (FEC) code;
dividing the code word into multiple segments;
generating from the code word output data having a second bit rate that matches an available bit rate of the communication channel, by deciding, for each segment of the code word, whether to discard the segment, repeat the segment or transmit the segment without repetition;
transmitting the output data over the communication channel at the available bit rate; and
receiving and decoding the output data from the communication channel so as to reconstruct the input data.

2. The method according to claim 1, wherein the communication channel comprises a Constant Bit Rate (CBR) channel.

3. The method according to claim 1, and comprising transmitting over the communication channel indications, which indicate actions applied to the respective segments, wherein receiving and decoding the output data comprise receiving the indications and reconstructing the input data responsively to the indications.

4. The method according to claim 3, wherein the encoded data in a given segment comprises multiple bits, and wherein reconstructing the input data comprises assigning respective metrics to the bits in the given segment, processing the metrics responsively to a respective indication related to the given segment, and decoding the FEC based on the processed metrics.

5. The method according to claim 4, wherein reconstructing the input data comprises identifying, based on the indication, that the given segment was discarded, re-generating the discarded segment and assigning the metrics so as to indicate that the bits in the re-generated segment are uncertain.

6. The method according to claim 4, wherein reconstructing the input data comprises identifying, based on the indication, that the given segment repeats a previous segment, and combining the metrics of the corresponding bits in the given segment and the previous segment.

7. The method according to claim 1, wherein processing the input data comprises interleaving the code word, and wherein receiving and decoding the output data comprise de-interleaving the interleaved code word.

8. The method according to claim 1, wherein processing the input data and receiving and decoding the output data comprise preserving the first variable bit rate in the reconstructed input data.

9. The method according to claim 8, wherein preserving the first variable bit rate comprises storing the received output data in a memory, and reading the stored data from the memory at a variable latency that preserves the first variable bit rate.

10. The method according to claim 8, wherein preserving the first variable bit rate comprises, before transmitting the output data, delaying the output data by a variable latency that preserves the first variable bit rate in the reconstructed input data.

11. The method according to claim 1, wherein the output data is associated with a given communication link, and wherein transmitting the output data comprises multiplexing the output data over the communication channel with at least one other output data associated with another communication link.

12. The method according to claim 11, wherein the other communication link is specified to transfer the other output data at a low latency, and wherein multiplexing the output data and the other output data comprises giving the other output data priority over the output data.

13. Apparatus for communication over a communication channel, the apparatus comprising:
a transmitter, which is arranged to process input data accepted at a first variable bit rate, so as to produce a code word of a Forward Error Correction (FEC) code, to divide the code word into multiple segments, to generate from the code word output data having a second bit rate that matches an available bit rate of the communication channel, by deciding, for each segment of the code word, whether to discard the segment, repeat the segment or transmit the segment without repetition, and to transmit the output data over the communication channel at the available bit rate; and
a receiver, which is arranged to receive and decode the output data from the communication channel so as to reconstruct the input data.

14. The apparatus according to claim 13, wherein the communication channel comprises a Constant Bit Rate (CBR) channel.

15. The apparatus according to claim 13, wherein the transmitter is arranged to transmit over the communication channel indications, which indicate actions applied by the transmitter to the respective segments, and wherein the receiver is arranged to receive the indications and to reconstruct the input data responsively to the indications.

16. The apparatus according to claim 15, wherein the encoded data in a given segment comprises multiple bits, and wherein the receiver is arranged to assign respective metrics to the bits in the given segment, to process the metrics responsively to a respective indication related to the given segment, and to decode the FEC based on the processed metrics.

17. The apparatus according to claim 16, wherein the receiver is arranged to identify, based on the indication, that the given segment was discarded, to re-generate the discarded segment and to assign the metrics so as to indicate that the bits in the re-generated segment are uncertain.

18. The apparatus according to claim 16, wherein the receiver is arranged to identify, based on the indication, that the given segment repeats a previous segment, and to combine the metrics of the corresponding bits in the given segment and the previous segment.

19. The apparatus according to claim 13, wherein the transmitter is arranged to interleave the code word, and wherein the receiver is arranged to de-interleave the interleaved code word.

20. The apparatus according to claim 13, wherein the transmitter and the receiver are arranged to preserve the first variable bit rate in the reconstructed input data.

21. The apparatus according to claim 20, wherein the receiver is arranged to preserve the first variable bit rate by storing the received output data in a memory, and reading the stored data from the memory at a variable latency that preserves the first variable bit rate.

22. The apparatus according to claim 20, wherein the transmitter is arranged to preserve the first variable bit rate by delaying the output data by a variable latency that preserves the first variable bit rate in the reconstructed input data.

23. The apparatus according to claim 13, wherein the output data is associated with a given communication link, and comprising a management unit, which is arranged to multiplex the output data over the communication channel with at least one other output data associated with another communication link.

24. The apparatus according to claim 23, wherein the other communication link is specified to transfer the other output data at a low latency, and wherein the management unit is arranged to give the other output data priority over the output data.

* * * * *